Aug. 8, 1950     H. G. CRAIG     2,517,846
FLUSH PIN GAUGE
Filed June 20, 1945
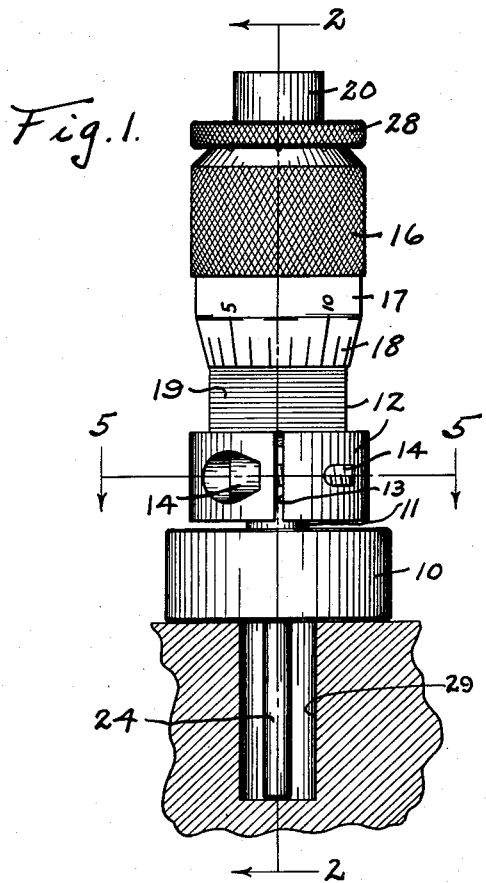
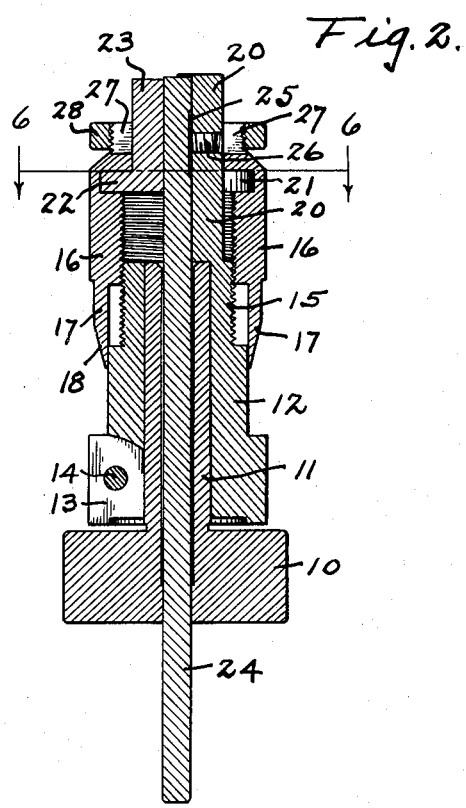
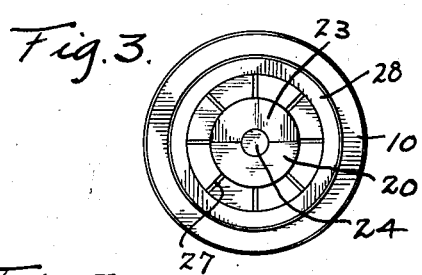
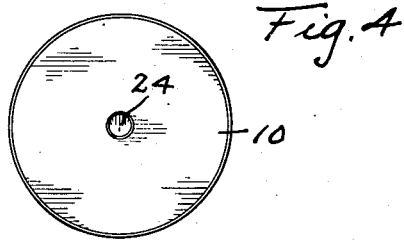
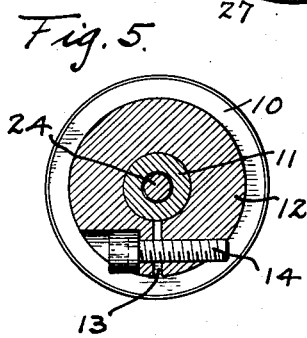
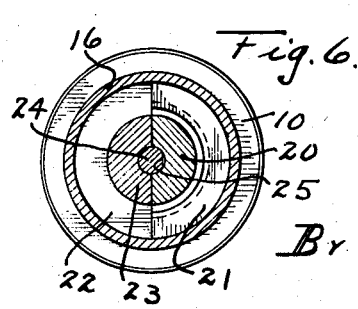
INVENTOR,
HARRY G. CRAIG,
By Herbert A. Minturn,
ATTORNEY.

Patented Aug. 8, 1950

2,517,846

UNITED STATES PATENT OFFICE 2,517,846

FLUSH PIN GAUGE

Harry G. Craig, Evansville, Ind., assignor of one-half to Walter H. Schnacke, Evansville, Ind.

Application June 20, 1945, Serial No. 600,586

3 Claims. (Cl. 33—170)

This invention relates to a production flush pin gauge and has for a primary object a provision in such a gauge of a structure whereby the gauge may be used throughout a wide range of dimensions to be checked, indicating for each particular setting of the gauge the checked dimension within the required tolerance limits, whereby the dimension to be checked, such as a depth of a hole, may at once be indicated by the gauge, both visually and by feel.

Heretofore such gauges for production work have been made for the particular dimension to be checked and are useless in checking other dimensions varying therefrom. This meant that a large number of gauges would ordinarily have to be provided, not only to check the varying hole depths, but with no provision for indicating the tolerance range.

By use of my invention, the gauge may be initially set to check the specified dimension, and the gauge so used throughout the production run. Thereafter the gauge may be reset for a different dimension as may be desired and again be used without alteration other than merely resetting it, and when necessary, substituting a different length of pin. No change, however, would be made in the gauge itself.

These and many other objects and advantages of the invention will become apparent to those versed in the art in the following description of one particular form of the invention as illustrated in the accompanying drawing, in which Fig. 1 is a view in side elevation of a structure embodying the invention;

Fig. 2, a view in section on the line 2—2 in Fig. 1;

Fig. 3, a view in end elevation;

Fig. 4, a view in opposite end elevation;

Fig. 5, a view in section on the line 5—5 in Fig. 1; and

Fig. 6, a view in section on the line 6—6 in Fig. 2.

Like characters of reference indicate like parts throughout the several views in the drawing.

I form an anvil 10 cylindrical in shape and preferably of considerable mass proportionately to other parts of the gauge as indicated in the drawing. Centrally from this anvil 10 extends integrally therefrom a tubular stem 11. The anvil 10 is preferably made of tool steel, hardened and finished ground over all of those external surfaces. The stem 11 is likewise ground throughout its length.

A sleeve 12 is formed to have a central bore within which is slidingly received with a close fit the stem 11. The end portion of the sleeve 12 which approaches the anvil 10 is enlarged cylindrically and is split through on one side by the slot 13, and then a screw 14 is chordally passed through this enlarged end across the slot 13 to screw-threadedly engage the end whereby that end may be pinched together around the stem 11 as a means for fixing the sleeve 12 in any desired position longitudinally of the stem.

The opposite end of the sleeve 12 is provided with a reduced diameter portion 15, the external surface of which is screw-threaded to receive thereover the internally screw-threaded portion of the thimble 16. This thimble 16 has a skirt 17 which will telescope over the sleeve 12 in the nature of a micrometer caliper sleeve. A bevelled end portion 18 of the thimble 16 is graduated, as indicated in Fig. 1, and the external surface of the sleeve 12 over which the skirt 17 extends is graduated by parallel lines 19 extending circumferentially around the sleeve.

The sleeve 12 has a semicircular post 20 extending on through the central bore of the thimble 16 to extend normally therebeyond. This post 20 has an outside radius of curvature such that the post has a clearance between that surface and the internal threads of the thimble 16. The post 20 has an inner radius of curvature a few thousandths of an inch at least less than the radius of curvature of the ends of the bore through the stem 11.

The thimble 16 is provided with an internal annular groove 21 at the outer end of the threaded portion, Fig. 2, and within this groove 21 is received the semicircular foot 22 of a slide 23. The slide 23 has an outer curved surface having a radius of curvature corresponding to the external surface of the post 20, the slide and the post forming when placed one against the other, a continuous cylindrical surface therearound. This slide 23 has an inner semicylindrical surface, the radius of curvature of which equals that of the inner surface of the post 20. Thus, when the slide 23 is placed against the post 20, the contacting surfaces of these two members therebetween being diametrically planar, a cylindrical bore is left therethrough of continuous diameter even though the slide 23 is shifted longitudinally of the flat face of the post 20. Since the foot 22 of the slide 23 is carried within the groove 21 of the thimble 16, rotation of the thimble 16 will advance the slide 23 along the post 20 without rotative movement of the slide 23 by reason of the abutment of the slide 23 by its flat face against the flat face of the post 20.

The gauge pin 24 is carried to extend through the bore of the stem 11 and project beyond the anvil 10. The pin 24 is longitudinally shiftable in respect to the anvil 10 within predetermined limits as determined by the length of a flat spot 25 formed along one side near one end of the pin 24 within the post 20. A set screw 26 is screw-threadedly carried by the post 20 to enter transversely thereof to have an inner end come within the ends of the flat spot 25 as a means of retaining the pin 24 as above indicated. The pin 24 has a close sliding fit through a portion at least of the anvil 10 and through the bore between the post 20 and the slide 23.

Adjustment of the slide 23 toward the post 20 is had by the expedient of providing a plurality of radical slots 27 across a reduced outer diameter portion of the thimble 16 and then passing a nut 28 screw-threadedly over that portion by means of a slightly tapered thread whereby that end portion may be slightly contracted to secure the desired fit relatively between the slide, post, and an internal wall of the thimble 16 which fits around the outside of the post 20 and the slide 23.

All of the parts are precision made and interfitted. The ends of the pin 24 are ground square in relation to its axis and the overall length of the pin is ground to an accurate dimension.

Now by properly adjusting the anvil 10 in relation to the end of the sleeve 12 and by selection of the proper length pin 24, the thimble may be revolved to that setting as indicated by the calibrations on the end of the thimble and on the sleeve to carry the slide 23 accordingly longitudinally inwardly or outwardly in respect to the outer end of the post 20 to set the end of the slide 23 in that position whereby the longitudinal distance between the ends of the post 20 and the slide 23 will be the maximum tolerance permitted for the particular dimension to be checked. That is, if the end of the post 20 is set in relation to the outer face of the anvil 10 for the minimum limit of tolerance, the end of the slide 23 will be set for the maximum tolerance so that when the gauge is placed over a hole 29, for example, Fig. 1, and the pin 24 rests on the bottom thereof, the upper end of the pin should lie between the ends of the post 20 and the slide 23 as indicated in Fig. 2, if that hole has been given a depth to be within the tolerance limits for which the gauge is set. This indication is visible by observing the position of the end of the pin 24 in relation to the ends of the slide 23 and the post 20. That setting can also be determined very quickly by feel. Of course, if the end of the pin 24 is above the end of the post 20 or below the end of the slide 23, the hole is either not deep enough or is too deep accordingly. The gauge may be very quickly set by loosening the screw 14 and shifting the anvil 10 relative to the sleeve 12 to the desired distance as may be checked by a micrometer caliper between the end of its movable spindle and its anvil to have the end of the post 20 and the outer face of the anvil 10 of the gauge in abutment therebetween. In the absence of a sufficiently large caliper, a gauge block may be employed between the end of the sleeve 12 and the opposing face of the anvil 10 since those faces are ground to be parallel one with the other and the anvil 10 is given a definite height.

While I have herein shown and described my invention in the one particular form, it is obvious that structural variations may be employed without departing from the spirit of the invention, and I therefore do not desire to be limited to that precise form beyond the limitations as may be imposed by the following claims.

I claim:

1. In a production flush pin gauge for gauging the depth of a hole, an anvil; a tubular stem extending from the anvil; said anvil and stem having a bore extending axially therethrough; a sleeve slidingly telescoping over said stem; an outer end on said sleeve; said sleeve being externally threaded at least toward its outer end; means for adjustably fixing the sleeve at selected positions along the stem; a post extending longitudinally from said stem in fixed relation thereto; a slide fitting against and shiftable along said post; a thimble telescoping over said post, said slide, and said sleeve, and threaded internally to engage with a threaded portion of the sleeve to have an outer end portion of both the sleeve and the post to extend outwardly beyond the thimble; means interengaging said slide with said thimble to advance and retract the slide along said post upon corresponding travel of the thimble; said slide having an outer planar end shiftable into and out of the plane of the outer end of said post by said thimble travel; and a pin slidably carried in said bore to be shiftable axially thereof and along said post and having a length exceeding the combined axial lengths of said anvil, stem and post; whereby, upon selection of the proper length of pin for the depth of the hole to be gauged, positioning of the sleeve along the stem, and the turning of the thimble to adjust the slide end a permitted tolerance distance from said post end, the outer end of said pin will be between the slide end and the post end when inserted into the hole from the anvil end of the gauge when that hole depth is within the predetermined tolerance range.

2. In a production flush pin gauge for gauging the depth of a hole, an anvil; a tubular stem extending from the anvil; said anvil and stem having a bore extending axially therethrough; a sleeve slidingly telescoping over said stem; an outer end on said sleeve; said sleeve being externally threaded at least toward its outer end; means for adjustably fixing the sleeve at selected positions along the stem; a post extending longitudinally from said stem in fixed relation thereto; a slide fitting against and shiftable along said post; a thimble telescoping over said post, said slide, and said sleeve, and threaded internally to engage with a threaded portion of the sleeve to have an outer end portion of both the sleeve and the post to extend outwardly beyond the thimble; means interengaging said slide with said thimble to advance and retract the slide along said post upon corresponding travel of the thimble; said slide having an outer planar end shiftable into and out of the plane of the outer end of said post by said thimble travel; and a pin slidably carried in said bore to be shiftable axially thereof and along said post and having a length exceeding the combined axial lengths of said anvil, stem and post; whereby, upon selection of the proper length of pin for the depth of the hole to be gauged, positioning of the sleeve along the stem, and the turning of the thimble to adjust the slide end a permitted tolerance distance from said post end, the outer end of said pin will be between the slide end and the post end when inserted into the hole from the anvil end of the gauge when that hole depth is within the predetermined tolerance range; said post being cut away along one side to form a surface over which said slide may travel, said post and said slide together completing walls defining a bore therebetween and axially aligned with said stem and anvil bore.

3. In a production flush pin gauge for gauging the depth of a hole, an anvil, a tubular stem extending from the anvil; said anvil and stem having a bore extending axially therethrough; a sleeve slidingly telescoping over said stem; an outer end on said sleeve; said sleeve being externally threaded at least toward its outer end; means for adjustably fixing the sleeve at selected positions along the stem; a post extending longitudinally from said stem in fixed relation thereto; a slide fitting against and shiftable along said post; a thimble telescoping over said post, said slide, and said sleeve, and threaded internally to engage with a threaded portion of the sleeve to have an outer end portion of both the sleeve and the post to extend outwardly beyond the thimble; means interengaging said slide with said thimble to advance and retract the slide along said post upon corresponding travel of the thimble; said slide having an outer planar end shiftable into and out of the plane of the outer end of said post by said thimble travel; and a pin slidably carried in said bore to be shiftable axially thereof and along said post and having a length exceeding the combined axial lengths of said anvil, stem and post; whereby, upon selection of the proper length of pin for the depth of the hole to be gauged, positioning of the sleeve along the stem, and the turning of the thimble to adjust the slide end a permitted tolerance distance from said post end, the outer end of said pin will be between the slide end and the post end when inserted into the hole from the anvil end of the gauge when that hole depth is within the predetermined tolerance range; said post being cut away along one side to form a surface over which said slide may travel, said post and said slide together completing walls defining a bore therebetween and axially aligned with said stem and anvil bore; said thimble and said slide interengaging means comprising a foot on said slide slidingly received in an internal annular slot of the thimble; outer surfaces on said slide and said post forming a cylinder about which said thimble slidingly turns to maintain the slide against said post.

HARRY G. CRAIG.

REFERENCES CITED

The following references are of record in the file of this patent:

UNITED STATES PATENTS

| Number | Name | Date |
| --- | --- | --- |
| 664,211 | Clapp | Dec. 18, 1900 |
| 1,317,746 | Whatley | Oct. 7, 1919 |

OTHER REFERENCES

Machinery (magazine), page 911, July, 1926.